United States Patent [19]

Rowlette

[11] Patent Number: 4,507,372
[45] Date of Patent: Mar. 26, 1985

[54] POSITIVE BATTERY PLATE

[75] Inventor: John R. Rowlette, Monrovia, Calif.

[73] Assignee: California Institute of Technology, Pasadena, Calif.

[21] Appl. No.: 488,199

[22] Filed: Apr. 25, 1983

[51] Int. Cl.$^3$ .................. H01M 4/56; H01M 4/62
[52] U.S. Cl. .................. 429/228; 429/232; 252/182.1
[58] Field of Search .......... 429/135, 228, 232, 225, 429/235, 7; 252/182.1

[56] References Cited

U.S. PATENT DOCUMENTS

| | | | |
|---|---|---|---|
| 1,788,571 | 1/1931 | Gardiner et al. | 429/228 |
| 3,556,855 | 1/1971 | Howells | 429/235 |
| 4,143,212 | 3/1979 | Ueno et al. | 429/7 |
| 4,323,470 | 4/1982 | Mahato et al. | 429/228 |
| 4,326,017 | 4/1982 | Will | 429/228 |
| 4,329,408 | 5/1982 | Mao et al. | 429/228 |

Primary Examiner—Brian E. Hearn
Assistant Examiner—Gerard P. Rooney, Jr.
Attorney, Agent, or Firm—Marvin E. Jacobs

[57] ABSTRACT

The power characteristics of a lead acid battery are improved by incorporating a dispersion of 1 to 10% by weight of a thermodynamically stable conductivity additive, such as conductive tin oxide coated glass fibers (34) of filamentary glass wool (42) in the positive active layer (32) carried on the grid (30) of the positive plate (16). Positive plate potential must be kept high enough to prevent reduction of the tin oxide to tin by utilizing an oversized, precharged positive paste.

13 Claims, 4 Drawing Figures

POSITIVE BATTERY PLATE

DESCRIPTION

Origin of the Invention

The invention described herein was made in the performance of work under a NASA contract and is subject to the provisions of Section 305 of the National Aeronautics and Space Act of 1958, Public Law 83-568 (72 Stat 435; 42 USC 2457).

TECHNICAL FIELD

The present invention relates to positive plates for batteries and, more particularly, to a positive plate for a lead-acid battery having improved conductivity.

BACKGROUND ART

Even though there has been considerable study of alternative electrochemical systems, the lead-acid battery is still the battery-of-choice for general purpose uses such as starting a vehicle, boat or airplane engine, emergency lighting, electric vehicle motive power, energy buffer storage for solar-electric energy, and field hardware whether industrial or military. These batteries may be periodically charged from a generator.

The conventional lead-acid battery is a multicell structure. Each cell contains a plurality of vertical positive and negative plates formed of lead-based alloy grids containing layers of electrochemically active pastes. The paste on the positive plate when charged contains lead dioxide which is the positive active material and the negative plates contain a negative active material such as sponge lead. This battery has been widely used in the automotive industry for many years and there is substantial experience and tooling in place for manufacturing this battery and its components and the battery is based on readily available materials, is inexpensive to manufacture and is widely accepted by consumers.

However, during discharge, the lead dioxide (a fairly good conductor) in the positive plate is converted to lead sulfate, an insulator. The lead sulfate can form an impervious layer encapsulating the lead dioxide particles which limits the utilization to less than 50% of capacity, typically around 30%. The power output is significantly influenced by the state-of-discharge of the battery, since the lead sulfate provides a circuit resistance whenever the battery is under load. Furthermore, the lead sulfate can grow into large, hard, angular crystals, disrupting the layer of paste on the grid resulting in flaking and shedding of active material from the grid. Power consumption during charge is also increased due to the presence of the lead sulfate insulator. The lead sulfate crystals in the negative electrode can grow to a large, hard condition and, due to their insulating characteristics, are difficult to reduce to lead. Even when very thin pastes are utilized, the coating of insulating lead sulfate interferes with power output. Thus, power capability is greatly influenced by the state-of-charge of the battery.

An apparent solution to this problem would be the addition of a conductive filler to the paste. The filler must be thermodynamically stable to the electrochemical environment of the cell, both with respect to oxidation and reduction at the potential experienced during charge and discharge of the cell, and to attack by the acid.

It has been attempted to increase the conductivity of the paste by adding a conductive filler such as graphite. Graphite has been used successfully as a conductive filler in other electrochemical cells, such as in the manganese dioxide positive active paste of the common carbon-zinc cell, and mixed with the sulfur in sodium-sulfur cells. However, even though graphite is usually a fairly inert material, it is oxidized in the aggressive electrochemical environment of the lead-acid cell to acetic acid. The acetate ions combine with the lead ion to form lead acetate, a weak salt readily soluble in the sulfuric acid electrolyte. This reaction depletes the active material from the paste and ties up the lead as a salt which does not contribute to production or storage of electricity. Highly conductive metals such as copper or silver are not capable of withstanding the high potential and strong acid environment present at the positive plate of a lead-acid battery. A few electrochemcially-inert metals such as platinum are reasonably stable. But the scarcity and high cost of such metals prevents their use in high volume commercial applications such as the lead-acid battery. Platinum would be a poor choice even if it could be afforded, because of its low gassing overpotentials.

STATEMENT OF THE INVENTION

An improved lead-acid battery is provided in accordance with the invention in which the positive active material maintains conductivity during both charge and discharge cycles. The power output in the battery of the invention is more uniform since it is less dependent of the state-of-charge of the battery and more nearly approaches theoretical efficiency.

The improved power characteristics are provided by incorporating a material into the paste that is insoluble in the electrolyte, has a conductivity similar to the active material and is thermodynamically stable with respect to oxidation and reduction when it is subjected to the usual charging and discharging potentials of a lead-acid battery.

A suitable conductivity additive for the positive active paste in accordance with the present invention is tin dioxide ($SnO_2$) which can be predispersed in the paste or added in precursor form. $SnO_2$ can be present as a powder or coated onto a particulate or fibrous substrate such as glass powder or glass wool. Stannic oxide has a conductivity several times that of graphite. $SnO_2$ (doped) has a conductivity of 300 to 400 micro ohm cm vs. 1375 micro ohm cm for graphite.

Stannic oxide is thermodynamically stable to the oxidation/reduction potential in the electrochemical environment of a lead-acid battery, has about the same resistivity as $PbO_2$ when $SnO_2$ is coated onto glass, and refractory or baked type of $SnO_2$ is quite insoluble in sulfuric acid. Unlike $PbO_2$, the stannic acid conductivity additive will remain unchanged during the course of charge and discharge of the positive plate.

These and many other features and attendant advantages of the invention will become apparent as the invention becomes better understood by reference to the following detailed description when considered in conjunction with the accompanying drawings.

DETAILED DESCRIPTION OF THE DRAWINGS

Figure 1:
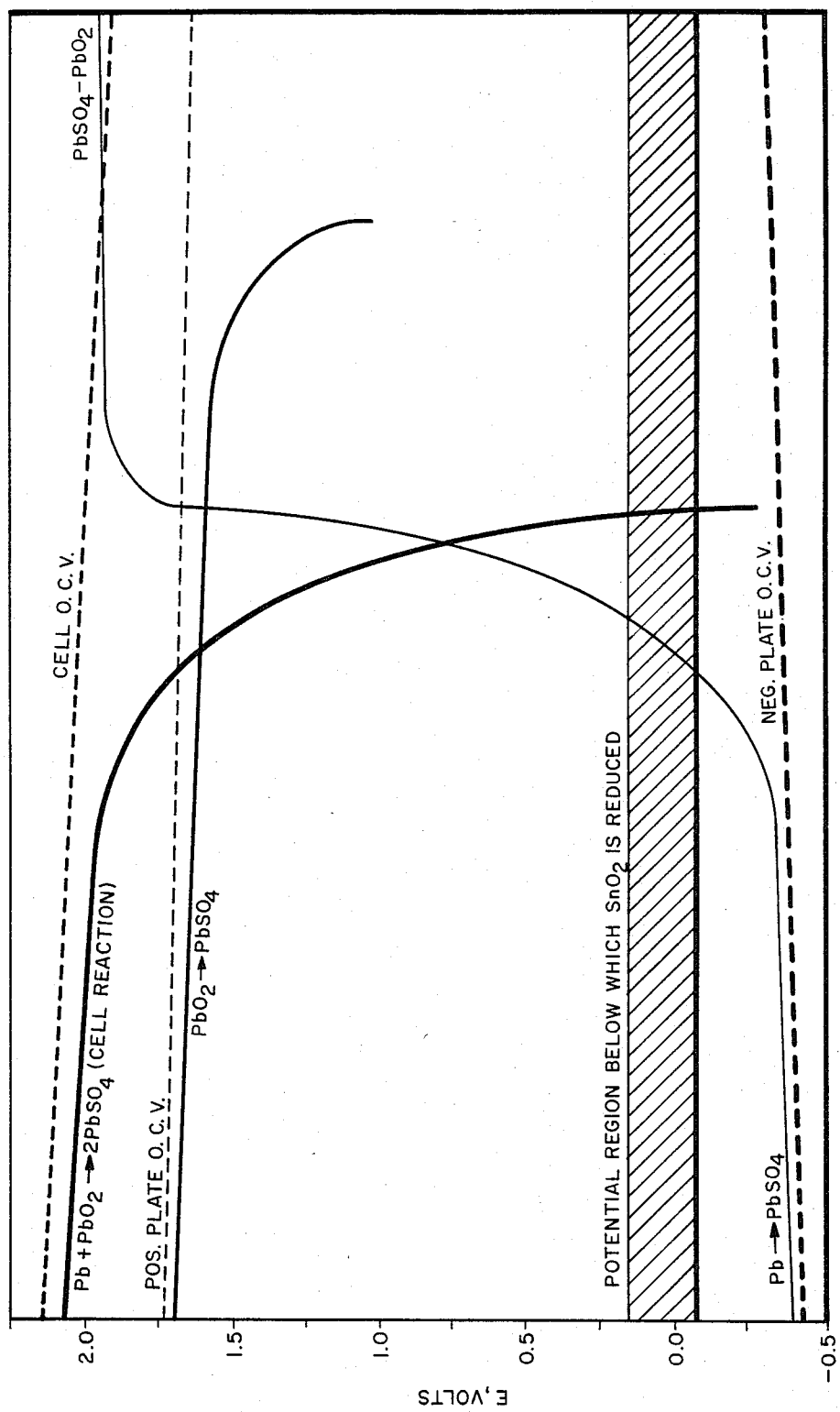
FIG. 1 is a graph of the open circuit voltage (OCV) of a lead acid cell and of each electrode and of the potential of each electrochemical reaction.
Figure 2:
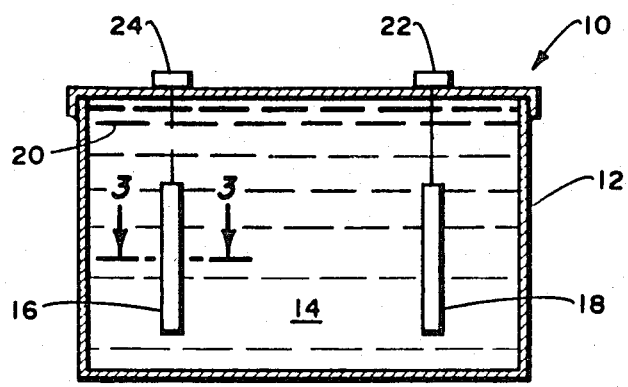
FIG. 2 is a schematic view of a lead-acid cell.

Referring now to FIG. 1, the electrode potentials referred to the standard hydrogen electrode are shown for the open circuit voltages for the cell and of each plate. Also shown are the potentials of various reactions occurring in a lead-acid battery. The potential region below which $SnO_2$ is reduced is shown in the cross-hatched region. A schematic cell is shown in FIG. 2. The cell 10 is housed in an electrolyte-impervious container 12 forming a cell compartment 14 in which is received a positive plate 16, negative plate 18 and a body 20 of aqueous sulfuric acid electrolyte. The cell can be connected in parallel or series to other cells, not shown. The negative plate 18 and positive plate 16 are connected to terminals 22, 24.

Positive plate potential must be kept high enough to prevent reduction of the $SnO_2$ to tin. This can be accomplished by utilizing an over-sized positive plate and placing a 5 to 10% precharge in the positive plate so that even when discharged, there is no danger of falling into the reduction zone for stannic oxide. Another means of preventing positive plate reversal is to connect a device, not shown, to the positive plate that senses potential and disables the positive plate when the positive electrode voltage is low enough to reduce $SnO_2$ to tin.

The negative plate 18 is of standard construction and is formed of a high area conductive substrate such as a lead on antimony-lead alloy ladder grid on which is deposited a layer of negative active material such as sponge lead. The negative active material can be formed by reducing a paste of lead oxide or tetrabasic lead sulfate to sponge lead.

Figure 3:
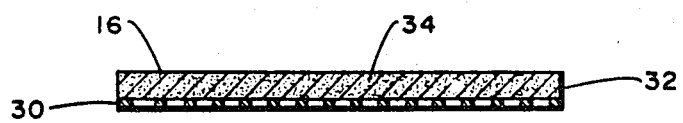
FIG. 3 is a sectional view of a positive plate containing conductive filler taken along line 3—3 of FIG. 2.

Referring now to FIG. 3 the positive plate 16 can also be formed of a conductive ladder grid 30 containing a layer 32 of positive active material such as lead dioxide in which is dispersed 1 to 10% by weight of conductive tin oxide in particulate form such as random fibers 34. The fibers form a conduction path through the layer 32.

Figure 4:
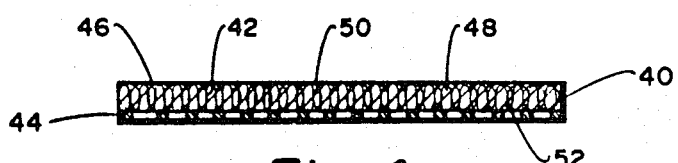
FIG. 4 is a schematic view of a positive plate containing a positive active layer in which positive active materials are dispersed in a conductive filamentary wool.

The tin oxide can also be a fine powder in filamentary form or can be coated onto a substrate such as glass in powder or fiber form. Glass wool can be utilized to form the continuous phase for the layer of paste. As shown in FIG. 4 the positive active layer 40 on grid 44 comprises glass wool 42 containing a conductive coating 46 of stannic oxide. The glass wool is impregnated with a paste 48 of lead dioxide and dried to form the layer 40 which contains a continuous conduction path through the filamentary glass wool from the outside surface 50 facing the electrolyte to the back surface 52 in contact with the grid 44. The stannic oxide coated glass wool can be chopped into roving or short lengths of glass fiber, or powder can be coated with conductive stannic oxide and dispersed in the wet paste before application to the grid.

The coating of stannic oxide onto glass to form conductive coating was developed over 30 years ago and has been widely practiced to defrost windshields in aircraft and automobiles. The conductive coating is applied to heated glass fibers or powder or glass wool from a solution of stannic chloride in hydrochloric acid as disclosed in U.S. Pat. No. 2,564,707, the disclosure of which is expressly incorporated herein by reference. The solution can be sprayed onto the heated fibers or the fibers can be pulled through a tank containing the solution and then heated in a furnace to a suitable high temperature such as about 700° C.

The diameter of the glass fibers is preferably very small such as from 1 to 20 microns. Very fine fibers are too hard to handle and large diameter fibers have too small a surface to provide adequate conductive surface. The fibers contain a conductive coating of stannic oxide from a monolayer in thickness to 10 microns, usually from 0.01 micron to 5 microns.

The following experiments were conducted to evaluate the performance of thin films of stannic oxide in the environment of a lead-acid battery.

EXAMPLE 1

Glass plates were coated with a conductive coating of stannic oxide following the procedure of Example of U.S. Pat. No. 2,564,707.

The stannic oxide coated glass plates of Example 1 were immersed in 5.3M $H_2SO_4$ at both 20° C. and 50° C. The plates were withdrawn periodically and the resistance of the thin film coating were measured. The results of measurements during 33 days are shown in Table 1.

TABLE 1

| Chemical corrosion of stannic oxide thin film in 5.301 M $H_2SO_4$. | | |
|---|---|---|
| TIME (DAYS) | 50° C. ELECTRODE RESISTANCE $\Omega$ (20° C.) | 20° C. ELECTRODE RESISTANCE $\Omega$ (20° C.) |
| 0 | 10.95 | 10.84 |
| 1 | 10.94 | 10.84 |
| 8 | 10.95 | 10.84 |
| 16 | 10.94 | 10.84 |
| 20 | 10.94 | 10.83 |
| 26 | 10.93 | 10.82 |
| 30 | 10.93 | 10.81 |
| 33 | 10.93 | 10.81 |

During that time at both temperatures listed, the resistance change was less than 1/1000 of the film's original condition (day=0). The two samples described in the table started with different resistance values for the reason that the plates do not have identical dimensions.

Electrochemical corrosion tests were run utilizing a PARC potentiostat, Model 173, to apply a constant potential to either the cathode or anode in the electrochemical cell. This was done by setting the potential of one of the electrodes relative to a saturated calomel reference electrode (SCE). Two tests were run simultaneously in separate cells. One case corresponded to the SOTF used as an anode (positive terminal) with a fixed potential. The counter electrode was a Pt foil. The second case had the SOTF situated as the cathode, again using the Pt foil as the counter electrode.

Shown in Table 2 is the data for ten days of electrochemical tests using SOTF as the anode.

TABLE 2

| Potentiostatic corrosion of stannic oxide thin film Anode potential = 1.058 V vs S C E Platinum cathode in 5.301 M $H_2SO_4$ at 22° C. | |
|---|---|
| TIME (DAYS) | RESISTANCE $\Omega$ (20° C.) |
| 0 | 8.12 |

TABLE 2-continued

Potentiostatic corrosion of stannic oxide thin film
Anode potential = 1.058 V vs S C E
Platinum cathode in 5.301 M $H_2SO_4$ at 22° C.

| TIME (DAYS) | RESISTANCE Ω (20° C.) |
|---|---|
| 2 | 8.11 |
| 7 | 8.11 |
| 10 | 8.12 |

With a potential of +1.06 V relative to a calomel electrode, the stannic oxide film did not show a change in resistance within the measurement uncertainty of the experimental apparatus.

The results of using the stannic oxide film as the cathode in the electrochemical cell are shown in Tables 3, 4, and 5.

TABLE 3

Potentiostatic corrosion of stannic oxide thin film
Cathodic potential - 0.695 V vs S C E
Platinum anode in 5.301 M $H_2SO_4$ at room temperature

| TIME (HRS) | RESISTANCE Ω (20° C.) | $R_T/R_o$ |
|---|---|---|
| 0 | 7.85 | 1.00 |
| ½ | 10.65 | 1.35 |
| 1½ | 16.53 | 2.10 |

TABLE 4

Potentiostatic corrosion of stannic oxide thin film
Cathodic potential - 0.1 V vs S.C.E.
Platinum anode in 5.301 M $H_2SO_4$ at room temperature.

| TIME (HRS) | RESISTANCE Ω (20° C.) | $R_T/R_o$ |
|---|---|---|
| 0 | 7.745 | 1.000 |
| 66 | 7.756 | 1.001 |
| 90 | 7.754 | 1.001 |
| 130 | 7.753 | 1.001 |

TABLE 5

Potentiostatic corrosion of stannic oxide thin film
Cathodic potential - 0.350 V vs S C E
Platinum anode in 5.301 M $H_2SO_4$ at room temperature

| TIME (HRS) | RESISTANCE Ω (20° C.) | $R_T/R_o$ |
|---|---|---|
| 0 | 7.599 | 1.000 |
| ½ | 7.622 | 1.003 |
| 1 | 7.641 | 1.005 |
| 2 | 7.667 | 1.009 |
| 3 | 7.678 | 1.010 |
| 5 | 7.868 | 1.011 |
| 7 | 7.696 | 1.012 |
| 24 | 7.863 | 1.034 |
| 30 | 7.933 | 1.043 |
| 95 | 9.589 | 1.261 |
| 115 | 9.981 | 1.313 |
| 163 | 10.873 | 1.430 |

It was found that significant deterioration occurs at both −0.70 V and −0.35 V. Reducing the potential to −0.10 V stopped the electrochemical corrosion. Over a five day period, there was no measuraeable change in film resistance.

After 33 days of conducting chemical corrosion testing, using electrical resistance as the criteria, less than 1/1000 change was detected in the measurements, i.e., the standard deviation is less than 1/1000. Since the error bar in the measurement may be a maximum 2/1000, a conservative approach to extrapolating the data is to assume an increase of 2/1000 in the film resistance every 30 days. At this rate of degradation, the SOTF (stannic oxide thin film) would take 20 years to double the initial electrical resistance.

The electrochemical corrosion resistance of the SOTF was determined in an electrochemical cell using the SOTF as either the positive or negative electrode and with Pt foil as the counter electrode. The cell was set up with a saturated calomel reference electrode (SCE) which was used to fix the potential of the SOTF electrode. As before, 5.3M sulfuric acid was used and all electrochemical tests were run at 20° C. The SOTF eletrode (coated glass plate) was removed periodically from the electrochemical cell and measurements were made of the films. Using the SOTF as the anode (positive electrode with a potential of +1.06 V versus SCE), less than 1/1000 change in electrical resistance was measured after 10 days of continuous running. Given this limited date, it would take approximately seven years for the SOTF to double the initial resistance value.

Another series of experiments were run using SOTF as the cathode (negative electrode) and Pt foil as the anode at 20° C. Initial runs, where the SOTF potential was set to −1.2 V relative to a SCE reference electrode, resulted in a complete degradation or corrosion of the thin film within a time frame of five to ten minutes. Running the electrochemical cell with SOTF at −0.70 V versus SCE and −0.35 V versus SCE resulted in a significant increase in film electrical resistance with time. For the case of −0.70 V the resistance doubled within a time of 1 hour while for −0.35 V the time for doubling of resistance is estimated to be 14 days. Reducing the SOTF potential further to −0.10 V versus SCE resulted in no noticeable resistance change during five days. Consequently, the threshold potential for degradation of SOTF appears to be between −0.10 V and −0.35 V versus SCE. Polarity reversal below −0.10 V should be avoided.

It is to be realized that only preferred embodiments of the invention have been described and that numerous substitutions, modifications and alterations are permissible without departing from the spirit and scope of the invention as defined in the following claims.

I claim:

1. A positive paste for a lead-acid battery comprising: a layer of positive active material containing a dispersion of tin oxide additive that is insoluble in sulfuric acid electrolyte, has a conductivity similar to the active material, and is thermodynamically stable during charge and discharge of said paste.

2. A paste according to claim 1 in which the positive active material comprises lead dioxide.

3. A paste according to claim 1 further including a high area conductive support for said paste.

4. A paste according to claim 1 in which the tin oxide is coated onto a particulate substrate.

5. A paste according to claim 4 in which the substrate is in powder, filamentary, or fiber form.

6. A paste according to claim 5 in which the substrate is a glass fiber having a diameter from 1 to 20 microns.

7. A paste according to claim 6 in which the tin oxide is present as a coating having a thickness from a monolayer to 10 microns.

8. A paste according to claim 7 in which the coated fibers are present in the paste in an amount from 1 to 10% by weight.

9. A lead-acid battery cell comprising in combination:

an electrolyte impervious enclosure receiving a body of liquid acid electrolyte;

a first electrode containing negative active lead material immersed in the body of electrolyte;

a second electrode immersed in said body of electrolyte, said second electrode containing a layer of positive active lead oxide material in which is dispersed 1 to 10% by weight of particulate tin oxide additive that is insoluble in sulfuric acid electrolyte, has a conductivity similar to the active material, and is thermodynamically stable during charge and discharge of said cell;

a positive and negative terminal; and means connecting the electrodes to their respective terminals.

10. A battery cell according to claim 8 in which the additive comprises tin dioxide coated onto a particulate support.

11. A battery cell according to claim 10 in which the support is glass.

12. A battery according to claim 11 in which the support is in fiber, filament or powder form.

13. A battery according to claim 12 in which the glass support is in the form of fibers having a diameter from 1 to 20 microns containing a layer of tin dioxide having a thickness from a monolayer to 10 microns.

* * * * *

UNITED STATES PATENT AND TRADEMARK OFFICE
CERTIFICATE OF CORRECTION

PATENT NO. : 4,507,372
DATED : March 26, 1985
INVENTOR(S) : John J. Rowlette

It is certified that error appears in the above-identified patent and that said Letters Patent are hereby corrected as shown below:

Column 2, line 17, correct "electrochemically".

Column 4, line 25, change "were" to --was--.

Column 5, line 59, correct "measureable".

Column 6, line 17, change "date" to --data--.

Signed and Sealed this

Seventh Day of January 1986

[SEAL]

Attest:

Attesting Officer

DONALD J. QUIGG

Commissioner of Patents and Trademarks